Feb. 17, 1948.  E. RAWSON  2,435,981
HOT WATER TANK
Filed Nov. 15, 1945
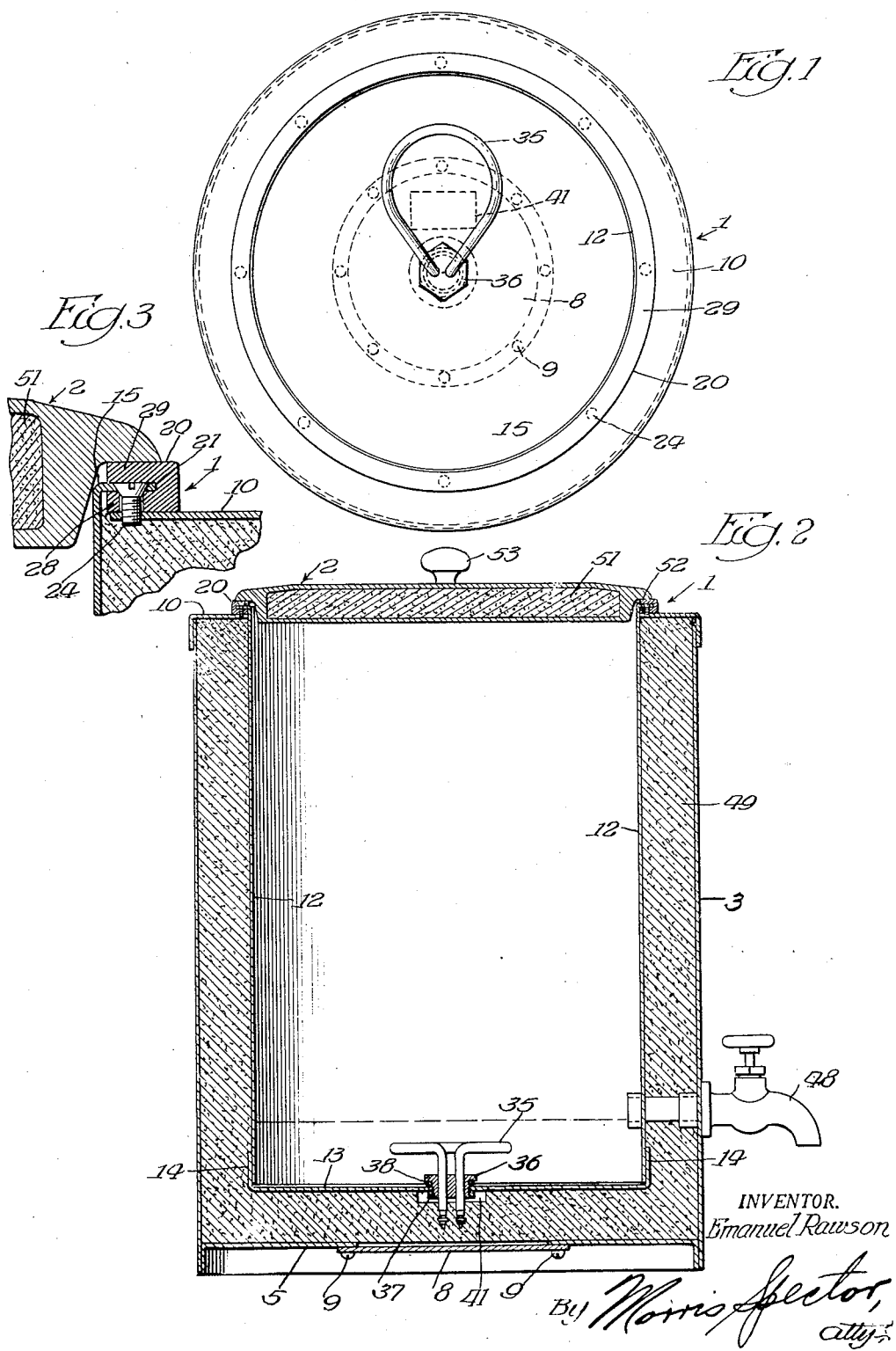
INVENTOR.
Emanuel Rawson
By Morris Spector,
Atty.

Patented Feb. 17, 1948

2,435,981

UNITED STATES PATENT OFFICE 2,435,981

HOT-WATER TANK

Emanuel Rawson, Chicago, Ill., assignor to Rite-Way Products Company, Chicago, Ill., a corporation of Delaware Application November 15, 1945, Serial No. 628,914

3 Claims. (Cl. 219—38)

This invention relates to portable hot water tanks, particularly electrically heated tanks such as are used, by way of example, in dairy barns for supplying hot water for washing and other purposes in connection with the milking of cows and the maintenance of clean and sanitary conditions of the equipment used.

Electrically heated water tanks of the above mentioned character generally comprise an open top casing having an inner open top cylindrical shell or container in which the water is electrically heated, and a removable cover for facilitating filling and cleaning of the cylindrical container. A faucet adjacent the bottom of the casing is provided for the withdrawal of the heated water. The container within which the water is contained, and heated, is generally made of metal, and is supported in a suitable manner from the outer casing. It is one of the objects of the present invention to provide an improved means for supporting the inner water cylinder from the outer casing. In accordance with the preferred embodiment of the invention the metal water cylinder is formed with an outwardly extending flange at the top thereof which flange is caused to rest on a ring or annular plate secured to the top of the outer casing. In order to inhibit the transfer of heat by conduction through the flange to the metal support therefor a heat insulating material is interposed between the two.

When the tank is reasonably full of hot water there is sufficient conduction of heat along the wall of the metal cylinder that holds the water so that the top of the outwardly extending flange which supports the cylinder may become sufficiently hot to produce an injury to a person accidentally touching the same. It is one of the objects of the present invention to prevent such injury by covering the top of the flange with a heat insulating material so as to avoid the possibility of a person accidentally touching the hot flange.

It is desirable that a gasket be interposed between the top of the tank opening and a removable cover placed thereon. It is one of the objects of the present invention to provide a combination wherein the same structure which heat insulates the flange from its supporting plate will also heat insulate the top of the flange against accidental contact therewith and, in addition, will also act as a gasket for the cover. This is accomplished, in the preferred embodiment of the invention, by providing a strip of flexible heat insulating gasketing material which has a lengthwise extending slot therein and winding said strip around the flange with the flange entering the slot in the yieldable strip so that the strip embraces both the upper and the lower surfaces of the flange.

It is a still further object of the present invention to provide a hot water tank with a simple heater mounting arrangement wherein the heater mounting means is substantially entirely embedded in the heat insulating material that encases the water cylinder, and the casing is provided with a simple and convenient means for obtaining access to the heater attachment for removal of the same.

The attainment of the above and further objects of the present invention will be apparent from the following specification taken in conjunction with the accompanying drawing forming a part thereof.

In the drawing:

Figure 1 is a top view of a hot water tank embodying the present invention, with the cover of the tank removed;

Figure 2 is a longitudinal sectional view through the tank; and

Figure 3 is an enlarged fragmentary view of a portion of Figure 2.

Reference may now be had more particularly to the drawing wherein like reference numerals designate like parts throughout.

The hot water tank of the present invention includes a cylindrical body 1 having a central cylindrical opening which is closed by a removable cover 2. The body comprises an outer shell or casing 3 of a generally cylindrical shape and made of any desired material as, for instance, sheet metal. The shell has a bottom 5 which is downwardly flanged around its entire periphery, said flange being welded to the inner bottom surface of the shell or casing. The bottom 5 has a central circular opening which is closed by a circular plate 8 that is secured in place in any desired manner as, for instance, by a series of screws 9. At the top of the cylinder 3 there is located a ring 10 which comprises a sheet metal annular disc downwardly flanged at its outer periphery by a flange which snugly embraces and extends entirely around the top of the shell 3 and is welded thereto.

Within the casing 3 there is located a water tank or cylinder 12 made of any non-corrosive material, preferably metal such as, for instance, copper, "Everdure" metal, galvanized steel or the like. The cylinder 12 is open at its top, and at its bottom is closed by a circular disc 13 that is upwardly flanged around its periphery, as indicated at 14, and makes a snug fit around the cylinder 12 and is welded or otherwise secured thereto in a manner to form a water tight seal at the bottom of the cylinder 12. The top of the cylinder 12 has an outwardly extending flange 15 extending around its entire periphery.

A strip 20 of rubber or other suitable flexible heat insulating gasketing material extends around the flange 15. This strip 20 is substantially rectangular in cross section and has a slot 21 extending lengthwise of the strip from one side thereof. The strip 20 is wound around the circumference of the flange 15 with the flange entering the slot 21 so that substantially the entire upper and lower surfaces of the flange are embedded within the strip 20. The flange 15 with the strip 20 thereon are positioned above the ring 10 so that the entire weight of the water tank or cylinder 12 with its contents is supported by the inner top surface of the ring 10. A plurality of circumferentially spaced sheet metal, self-tapping screws 24 extend through the flange 15 and are threaded into and through the ring 10, thus securing the cylinder 12 in place. The bottom portion 28 of the strip 20 serves as a heat break to inhibit the conduction of heat from the wall of the tank 12 via the flange to the ring 10. The portion of the strip 20 that overlies the flange 15, namely, the portion 29 of the strip 20, serves two purposes. First, it covers the entire upper surface of the flange 15 so that if a person should happen to touch the top of the water tank when the cover is removed, the person will not contact a part of the tank which is so hot as may injure the person; second, the portion 29 of the strip 20 is to act as a gasket for the cover 2.

Within the cylinder 12, adjacent the bottom thereof, there is located an immersion type electric heating element 35 which is supported at the center of the bottom 13 of the tank 12 as by a copper plated steel fitting 36 which extends through a hole in the bottom 13 and is locked in place by a steel nut 37, there being a copper asbestos sealing gasket 38 surrounding the steel fitting 36 and located between the flange thereof and the top surface of the disc 13. A thermostatic switching member 41 controls the circuit to the electric immersion heater 35. This thermostatic switching member 40 is located on the bottom side of the disc 13. A water outlet faucet 48 extends through the shell or casing 3 and the cylinder 12 at a level slightly above the level of the heating element so as to provide a reserve water space to protect the heater from burning out. The space between the casing 3 and the cylinder 12 is filled with a suitable heat insulating material 49.

The cover 2 comprises a molded circular rubber body which has a filling 51 of heat insulating material sealed therein and which has a peripheral flange 52 that rests on the top of the strip 20. A suitable knob 53 is provided for facilitating lifting and removal of the cover. The strip 20 acts as a gasket between the top of the water containing cylinder 12 and the cover.

In compliance with the requirements of the patent statutes I have here shown and described a preferred embodiment of my invention. It is, however, to be understood that the invention is not limited to the precise construction here shown, the same being merely illustrative of the principles of the invention. What is considered new and desired to be secured by Letters Patent is:

1. A hot water tank comprising an inner open top cylinder, an outer casing within which the cylinder is located, there being a space between the cylinder and the casing, electric heating means for heating the contents of the cylinder, an outwardly extending flange around the top of the cylinder, a strip of flexible heat insulating gasketing material having a lengthwise extending slot therein, said strip extending completely around the periphery of said flange with the flange entering the slot so that the strip embraces the upper and the lower surfaces of the flange, said flange being located above said outer casing and supported thereby with the portion of the heating insulating strip that is on the under side of the flange serving as a heat break in the heat conducting path from the flange to the outer casing, the portion of the strip above the flange serving to heat insulate the top of the flange against the danger of injuring a person who might otherwise touch the flange, and a cover for the cylinder, said cover resting on the portion of the strip above the flange which acts as a sealing gasket for the cover.

2. A hot water tank comprising an inner open top cylinder of metal, an outer casing within which the cylinder is located, there being a space between the cylinder and the casing, electric heating means for heating the contents of the cylinder, a ring secured to the top of the casing and extending towards and substantially up to the cylinder, an outwardly extending flange around the top of the cylinder, a strip of flexible heat insulating gasketing material having a lengthwise extending slot therein, said strip extending completely around the periphery of said flange with the flange entering the slot so that the strip embraces the upper and lower surfaces of the flange, said flange being located above said ring and supported thereby with the portion of the heating insulating strip that is on the under side of the flange serving to heat insulate the flange from the ring, the portion of the strip above the flange serving to heat insulate the top of the flange against the danger of injuring a person who might otherwise touch the flange, and a cover for the cylinder, said cover resting on the portion of the strip above the flange which acts as a sealing gasket for the cover.

3. A hot water tank comprising an inner open top cylinder of metal, an outer casing within which the cylinder is located, there being a space between the cylinder and the casing, a filling of heat insulating material in said space, electric heating means for heating the contents of the cylinder, a ring secured to the top of the casing and extending towards and substantially up to the cylinder, an outwardly extending flange around the top of the cylinder, a strip of flexible heat insulating gasketing material having a lengthwise extending slot therein, said strip extending completely around the periphery of said flange with the flange entering the slot so that the strip embraces the upper and the lower surfaces of the flange, said flange being located above said ring and supported thereby with the portion of the heating insulating strip that is on the under side of the flange serving to heat insulate the flange from the ring, screw means extending through the flange and through the portion of the strip below the flange and securing the cylinder in the ring on the casing, said screw means being covered by the portion of the strip above the flange which latter portion serves also to cover and thus heat insulate the top of the flange against the danger of injuring a person who might otherwise touch the flange, and a cover for the cylinder, said cover resting on the portion of the strip above the flange which acts as a sealing gasket for the cover.

EMANUEL RAWSON.

REFERENCES CITED

The following references are of record in the file of this patent:

UNITED STATES PATENTS

| Number | Name | Date |
|---|---|---|
| 2,299,053 | Ferris | Oct. 13, 1942 |